United States Patent
Dix et al.

[11] Patent Number: 5,953,387
[45] Date of Patent: Sep. 14, 1999

[54] SEPARATION DEVICE FOR A VENT VOLUME IN A NUCLEAR REACTOR

[75] Inventors: Gary E. Dix, Saratoga; Bruce Matzner, San Jose, both of Calif.

[73] Assignee: General Electric Company, Schenectady, N.Y.

[21] Appl. No.: 08/976,008

[22] Filed: Nov. 21, 1997

Related U.S. Application Data

[63] Continuation of application No. 08/625,888, Apr. 1, 1996, abandoned.

[51] Int. Cl.$^6$ .............................. G21C 3/16; G21C 3/32; G21C 15/16
[52] U.S. Cl. ........................ 376/435; 376/371; 376/377; 376/443; 122/488
[58] Field of Search .................................. 376/435, 439, 376/443, 444, 370, 377, 378, 371; 122/491, 492, 488, 489

[56] References Cited

U.S. PATENT DOCUMENTS

| | | | |
|---|---|---|---|
| 2,594,490 | 4/1952 | Patterson | 183/102 |
| 3,144,393 | 8/1964 | Raber et al. | 176/54 |
| 3,253,999 | 5/1966 | Weisman | 176/55 |
| 3,329,130 | 7/1967 | Cochran | 122/34 |
| 3,769,781 | 11/1973 | Klein et al. | 55/261 |
| 3,902,876 | 9/1975 | Moen et al. | 55/348 |
| 4,100,888 | 7/1978 | Fasnacht, Jr. | 122/438 |
| 4,856,461 | 8/1989 | Hayes | 122/488 |
| 5,017,332 | 5/1991 | Dix et al. | |
| 5,091,146 | 2/1992 | Dix | 376/443 |
| 5,202,084 | 4/1993 | Fennern et al. | 376/371 |
| 5,229,068 | 7/1993 | Johansson et al. | |
| 5,491,733 | 2/1996 | Patterson et al. | 376/443 |
| 5,668,728 | 9/1997 | Dix et al. | 376/443 |

FOREIGN PATENT DOCUMENTS

| | | | |
|---|---|---|---|
| 18490 | 1/1984 | Japan | 376/371 |
| 4244995 | 9/1992 | Japan | 376/370 |
| 5150064 | 6/1993 | Japan | 376/435 |
| 6075082 | 3/1994 | Japan | 376/370 |
| 6273571 | 9/1994 | Japan | 376/370 |

*Primary Examiner*—Harvey E. Behrend
*Attorney, Agent, or Firm*—Nixon & Vanderhye

[57] ABSTRACT

A steam/water separating device for a nuclear fuel bundle is located in a vent volume above part-length rods and includes a helical swirl vane. In one form, the swirl device lies below a vent tube and a transition element for flowing liquid laterally outwardly into the interstices of the fuel rods and steam upwardly within the vent tube. In another form, the vane depends from a cylindrical barrel open at its lower end. An annular pick-off tube extends into the open upper end of the barrel and lies in communication through a transition element with a superposed steam vent tube. An annular outlet is defined between the barrel and pick-off tube and the transition element deflects coolant water flowing through the annular outlet in a lateral outward direction for flow into the interstices of and onto the full-length fuel rods. Steam flows upwardly in the barrel through the pick-off tube into the steam vent tube.

17 Claims, 5 Drawing Sheets

SEPARATION DEVICE FOR A VENT VOLUME IN A NUCLEAR REACTOR

This is a continuation of application Ser. No. 08/625,888, filed Apr. 1, 1996, now abandoned.

TECHNICAL FIELD

The present invention relates to separation devices for separating liquid and steam in the upper two-phase region of a nuclear reactor and particularly relates to separation devices for disposition in a vent volume above the upper ends of part-length rods in the nuclear fuel bundle for effecting steam/water separation, flowing the steam upwardly and directing separated water to the surfaces and interstices of adjacent full-length fuel rods.

BACKGROUND

In a boiling water nuclear reactor, a plurality of nuclear fuel bundles are provided, each including a matrix of upstanding rods. These rods can contain either nuclear fuel or moderator. Each fuel rod contains a substantial number of stacked, cylindrical pellets of enriched uranium, the fuel rods being sealed at opposite ends. Moderator rods can contain either liquid water or a solid moderator material. The fuel rods of each bundle are supported on a lower tie plate and extend upwardly from the lower tie plate to an upper tie plate. The fuel bundle is thus defined by a lattice of rows and columns of vertically extending, generally parallel, laterally spaced fuel and moderator rods. In addition to supporting these rods, the lower tie plate permits entry of coolant/moderator water within the fuel bundle. The upper tie plate maintains the matrix of rods upright relative to the lower tie plate and permits the discharge of heated water and generated steam from the interior of the fuel bundle. The fuel bundle also includes spacers, for example, seven such spacers, spaced along the length of the fuel bundle. The spacers serve to maintain the rods laterally spaced from one another and are disposed at intervals along the lengths of the rods. A channel surrounds each fuel bundle and extends from the lower tie plate to the upper tie plate. The channel confines the water flow from the lower tie plate to the upper tie plate. The fuel bundles are positioned in the reactor core between a lower core plate and an overlying top guide.

In operation, water enters each fuel bundle through its lower tie plate and acts as both a coolant and a moderator as it flows toward the upper tie plate. As a coolant, the water is heated and evolves to steam by heat exchange with the fuel rods. As a moderator, fast neutrons from the nuclear reaction are moderated and become slow-moving or thermal neutrons to continue the chain reaction within the fuel bundle. As the water is heated, the bundles have increasing fractions of steam in the upper two-phase portion of the fuel bundle.

It has been found beneficial to provide one or more less than full-length rods in the nuclear fuel bundle and these rods are called part-length rods. These part-length rods, containing either nuclear fuel or moderator, are supported on the lower tie plate and extend upwardly toward the upper tie plate, terminating short of the upper tie plate in or just above one of the upper spacers, for example, the fifth or sixth spacer. Thus, a vent volume is defined between the upper ends of the part-length rods and the upper tie plate. A swirler vane may be disposed in the vent volume above the part-length rods, for example, as set forth in U.S. Pat. No. 5,229,068, for concentrating the flow of steam upwardly and directing the liquid in a generally lateral direction for disposition in the interstices of and onto the adjacent full-length fuel rods to increase the critical power limit. Even with those thermal hydraulic and neutronic improvements, however, it has been found desirable to further improve the steam/liquid separation by confining the separated steam for delivery directly upwardly toward the upper tie plate and positively directing the water onto the surfaces and into the interstices of the full-length fuel rods.

DISCLOSURE OF THE INVENTION

According to the present invention, there is provided improved water/steam separation devices for disposition within the vent volume above partial-length rods for separating the water and steam and directing the water onto the surfaces and into the interstices of the surrounding full-length fuel rods, while directing the separated steam upwardly into and through a steam vent tube. The steam vent tube has an enclosing surface and has openings at the top and bottom. A swirl device for imparting rotation to the upwardly flowing two-phase mixture is located below the bottom opening of the steam vent tube and above the end of the part-length rods. Preferably, the swirl device comprises generally helical arranged swirl vanes whose horizontal projected area is substantially coextensive with the horizontal cross-sectional area of the vent volume. The bottom opening of the steam vent tube is preferably circular, with a diameter that is less than the minimum horizontal dimension of the vent volume, to intercept the circular core flow of steam created by the swirl device. This is preferably combined with a transition element to match the circular cross-section of the inlet opening to the boundary of the steam vent tube. The transition element causes further deflection of the separated liquid outwardly onto the surfaces and into the interstices of the full-length fuel rods.

This separation device can be further provided with a circular separation barrel having an open bottom that encloses the upper portion of the swirl device. The upper end of the separation barrel is open and receives a pick-off tube depending from a superposed steam vent tube. The pick-off tube extends into the barrel and defines an outlet, preferably annular, open to the two-phase region of the fuel bundle. A transition element between the pick-off tube and the steam vent tube overlies the annular opening for deflecting separated liquid laterally outward onto the surfaces and into the interstices of the full-length fuel rods.

In operation, the swirl device imparts a rotation to the two-phase mixture such that separation occurs due to the centrifugal action, causing the higher density liquid to flow laterally outward and surrounding steam to flow into the vent volume. The steam flows upwardly into the opening at the bottom of the transition element and then expands into the steam vent tube. The steam flow within the steam vent tube is thereafter isolated from the outside two-phase mixture until it exits from the opening at the top of the steam vent tube. The steam vent tube is of such length and the steam flowing therein is of such velocity that any liquid in the upper two-phase region adjacent the upper end of the steam vent tube is prevented from overflowing into the steam vent tube.

When the separation device is further provided with a separation barrel and pick-off tube, preliminary separation occurs due to the centrifugal action below the separation barrel. The separation barrel isolates the external liquid that has flowed outward of the open swirl region. The separation barrel also causes the residual swirling liquid in the separation device to collect and flow as a circulating film on the inner surface of the separation barrel. As the circulating liquid film on the wall of the separation barrel flows upwardly, the liquid is separated from the steam. The liquid passes upwardly through the annular passage between the barrel and transition element while the steam flows into the pick-off tube. The transition element between the pick-off tube and the steam vent tube extends laterally outwardly in overlying relation to the outlet between the pick-off tube and the barrel to deflect the liquid exiting the annular gap for flow laterally outwardly into the interstices of and onto the full-length fuel rods. The steam, however, flows upwardly into the pick-off tube, past the transition element, and expands into the steam vent tube.

In a preferred embodiment according to the present invention, there is provided a separation device for upper regions of a nuclear reactor above part-length rods defining a vent volume for separating liquid and steam, comprising an enclosed steam vent tube for disposition in the vent volume, a swirl device for disposition below the steam vent tube for imparting rotation to the two-phase fluid within the vent volume above the part-length rods and a transition element between the vent tube and swirl device enabling lateral outward flow of liquid and flow of steam into the vent tube such that predominantly steam flows upward into the bottom opening of the vent tube with liquid flowing laterally outwardly onto the surfaces and into the interstices of the full-length fuel rods.

In a further preferred embodiment according to the present invention, there is provided a separation device for upper regions of a nuclear reactor for separating liquid and steam comprising a separation barrel having a generally open lower end, a swirler for imparting rotation to liquid flowing generally upwardly into the separation barrel through the lower end thereof, the swirler having a first portion thereof disposed in part within the barrel and a second portion thereof depending below the barrel, enabling lateral outward flow of liquid and flow of steam upwardly into the barrel and a steam vent tube disposed above the barrel and having a flow guide extending into the barrel for receiving the upward flow of steam therefrom, the steam vent tube defining with the barrel an outlet for liquid passing through the barrel.

In a further preferred embodiment according to the present invention, there is provided in combination with a fuel bundle for a boiling water nuclear reactor, the fuel bundle including a lower tie plate for supporting a matrix of vertically upstanding fuel rods and defining apertures for the inflow of water to the fuel bundle, an upper tie plate for maintaining the matrix of rods in vertical upstanding relation and defining apertures for permitting the outflow of water and generated steam, a channel surrounding the fuel bundle and extending from the lower tie plate to the upper tie plate for confining fluid flow between the tie plates and through the matrix of rods, at least one of the rods being a part-length rod terminating at an upper end below the upper tie plate, the part-length rod defining with respect to surrounding full-length rods and the upper tie plate a vent volume overlying the part-length rod, an enclosed steam vent tube disposed in the vent volume, and a separation device supported by the fuel bundle and disposed in the vent volume overlying the part-length rod and below the steam vent tube, the separation device including a swirler for imparting rotation to a two-phase mixture of water and steam flowing generally upwardly into the vent volume, and a transition element between the vent tube and the swirler enabling lateral outward flow of liquid and flow of steam into the vent tube such that predominantly stem flows upward into the bottom opening of the vent tube with liquid flowing laterally outwardly onto the surfaces and into the interstices of the full-length fuel rods.

In a still further preferred embodiment according to the present invention, there is provided in combination with a fuel bundle for a boiling water nuclear reactor, the fuel bundle including a lower tie plate for supporting a matrix of vertically upstanding fuel rods and defining apertures for the inflow of water to the fuel bundle, an upper tie plate for maintaining the matrix of rods in vertical upstanding relation and defining apertures for permitting the outflow of water and generated steam, a channel surrounding the fuel bundle and extending from the lower tie plate to the upper tie plate for confining fluid flow between the tie plates and through the matrix of rods, at least one of the rods being a part-length rod terminating at an upper end below the upper tie plate, the part-length rod defining with respect to surrounding full-length rods and the upper tie plate a vent volume overlying the part-length rod, and a separation device supported by the fuel bundle and disposed in the vent volume overlying the part-length rod and below the tie plate, the separation device including a separation barrel having a generally open lower end, a swirler for imparting rotation to liquid flowing generally upwardly into the separation barrel through the lower end thereof, the swirler having at least a portion thereof disposed in part within the barrel and a second portion thereof depending below the barrel, enabling laterally outward flow of liquid in a direction toward surrounding full-length fuel rods and flow of steam upwardly into the barrel, a steam vent tube disposed above the barrel, and a flow guide extending into the barrel for receiving the upward flow of steam therefrom for flow into the steam vent tube and defining with the barrel an outlet for liquid passing through the barrel.

Accordingly, it is a primary object of the present invention to provide a novel and improved separation device for separating water and steam in the upper two-phase region of a nuclear fuel bundle and particularly in a vent volume overlying part-length rods whereby liquid is directed laterally outwardly into the interstices of and onto full-length fuel rods and steam is directed and transported upwardly for flow out of the fuel bundle.

BEST MODE FOR CARRYING OUT THE INVENTION

Figure 1:
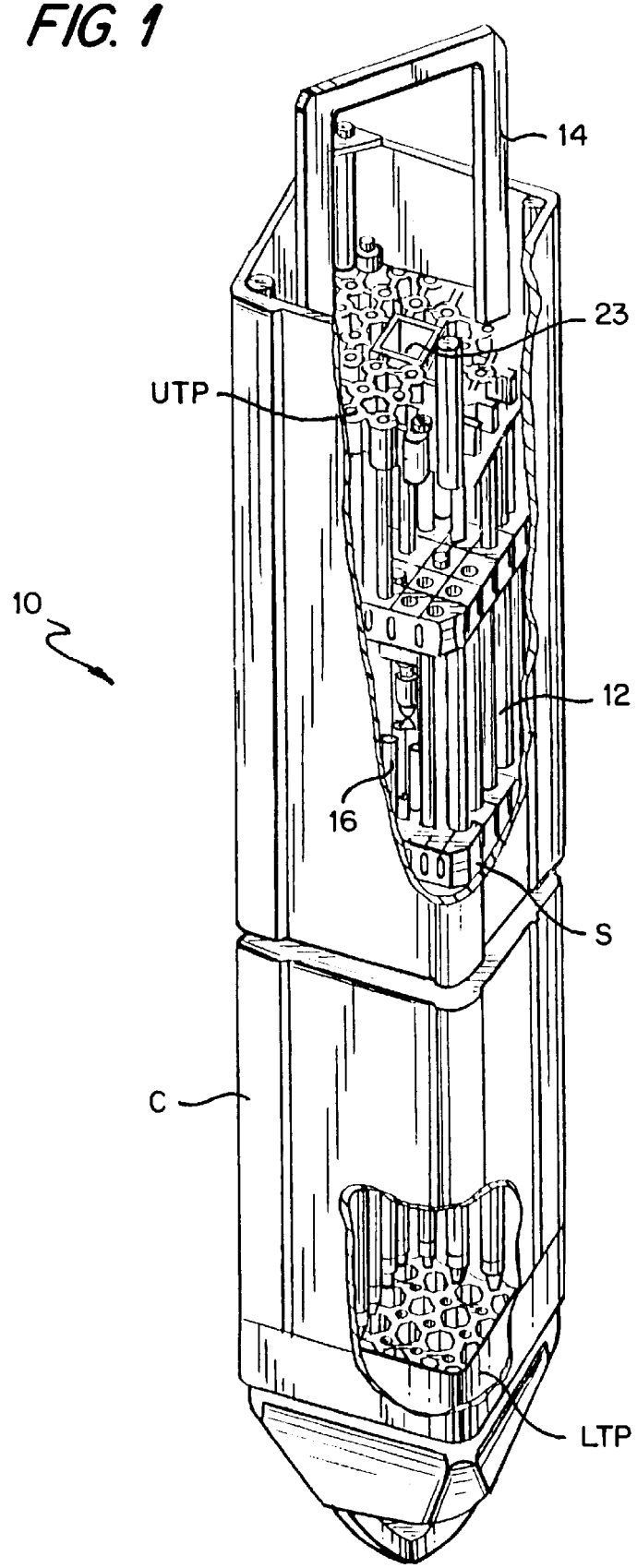
FIG. 1 is a perspective view with parts broken out and in cross-section of a fuel bundle incorporating a separation device according to the present invention.

Turning now to the drawings, particularly to FIG. 1, there is illustrated a nuclear fuel bundle, generally designated 10, having a matrix or lattice of full-length fuel rods 12 (which may include moderator rods) extending between a lower tie plate LTP and an upper tie plate UTP. A plurality of spacers S are disposed in vertically spaced relation one to the other along the height of the fuel bundle 10 and receive the rods 12, maintaining the rods in predetermined lateral positions relative to one another. The fuel bundle also includes a surrounding channel C extending between the upper and lower tie plates and a handle 14 is secured in a conventional manner to the upper end of the fuel bundle 10, facilitating manipulation of the fuel bundle. As those of skill in this art will appreciate, coolant/moderator flows through the bottom tie plate and upwardly within the channel C in the interstices of the rods 12 and steam is generated from the liquid coolant/moderator flow for flow upwardly out the upper end of the fuel bundle.

Beneficial effects have been previously achieved by the use of part-length fuel rods 16. Part-length fuel rods extend upwardly within the fuel bundle from the lower tie plate LTP and terminate at or slightly above one of the spacers, usually a spacer in the upper region. Typically, there are seven spacers and thus the part-length fuel rods 16 preferably terminate at or slightly above the fourth or fifth spacer. The space occupied by the part-length fuel rods takes the place of the space occupied by lower portions of a full-length fuel rod and, accordingly, the space between the upper end of the part-length fuel rod 16 and the upper tie plate UTP defines a vent volume. It is desirable in the operation of the nuclear reactor to improve the flow of moderator liquid in the upper two-phase region of the fuel bundle in the interstitial volumes about the full-length fuel rods above the upper ends of the part-length rods 16 to increase moderator density in that region and to facilitate flow of steam upwardly in the two-phase region of the bundle. As indicated previously, steam vent tubes have been proposed in the past for accomplishing this purpose and the present separation device constitutes an improvement toward those ends.

Referring now to FIGS. 2–5, there are illustrated separation devices according to the present invention. The devices 20 are located within the fuel bundle just above the upper ends of the part-length fuel rods 16. While the separation devices are illustrated as overlying the steam vent volume above the ends of four adjacent part-length rods 16, it will be appreciated that the separation devices may be sized and disposed above the upper ends of a greater or lesser number of part-length rods 16 as nuclear and other considerations are given effect. In the present embodiments, the separation devices are arranged centrally of the fuel bundle overlying the upper ends of four part-length fuel rods 16. Additionally, while an 8×8 matrix of fuel rods is illustrated, it will be appreciated that the separation device hereof may be used to overlie part-length fuel rods in fuel bundles having different arrays of fuel rods, for example, a 9×9 or 10×10 array. In the latter instance, it may be beneficial to provide groups of part-length fuel rods, for example, each group comprising four part-length fuel rods at various locations within the bundle and, accordingly, separation devices similarly as illustrated in FIGS. 2–5, respectively, may be deployed in the upper steam vent volumes above these groups of part-length fuel rods.

Figure 2:
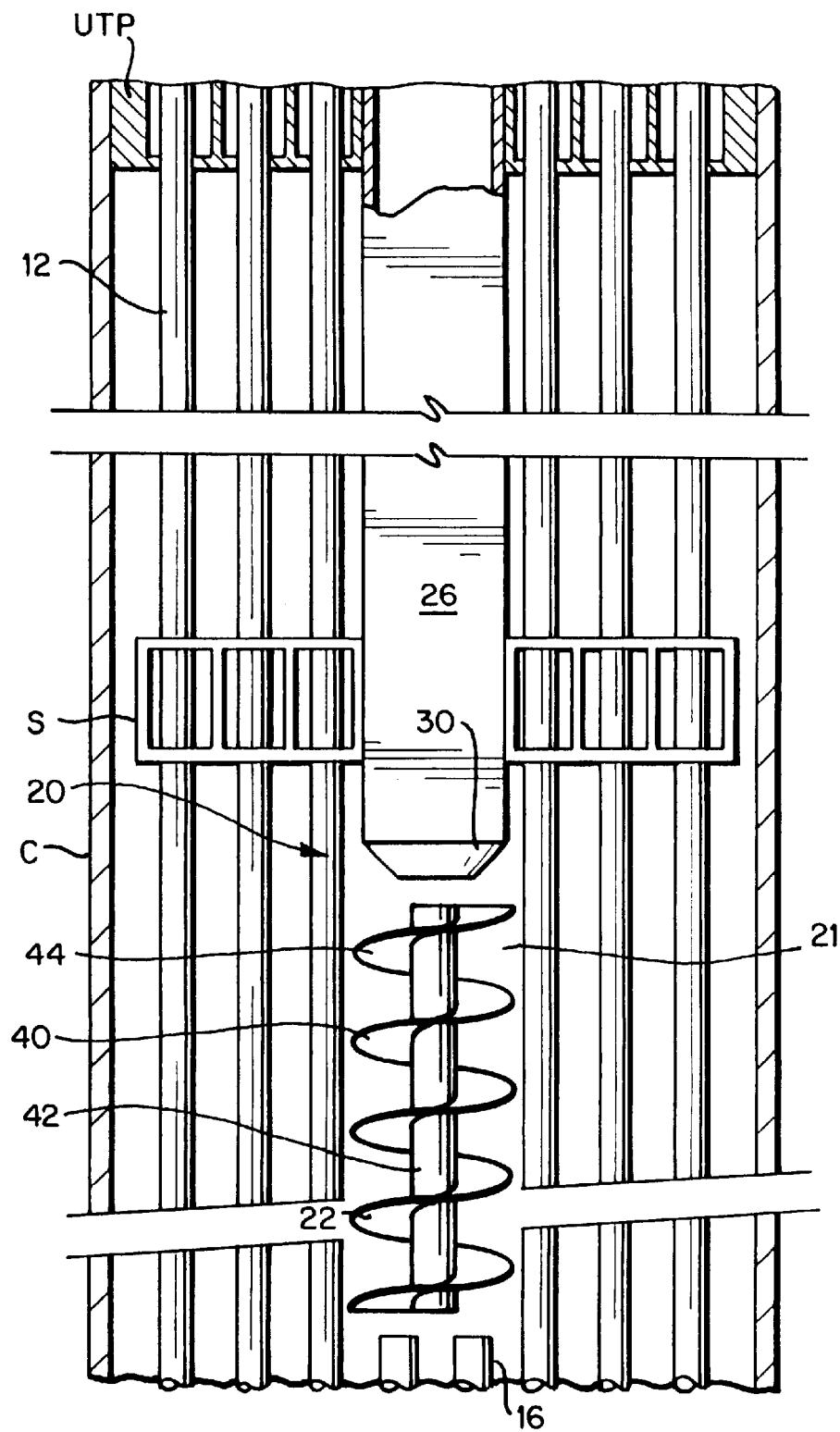
FIG. 2 is an enlarged fragmentary cross-sectional view of the upper region of a fuel bundle illustrating a separation device hereof.

Referring now particularly to FIG. 2, a water/steam separation device, generally designated 20, is disposed within the vent volume above the part-length fuel rods 16 for separating water and steam and directing the water onto the surfaces and into the interstices of the surrounding full-length fuel rods 12, while directing the separated steam upwardly, into and through a steam vent tube 26. Steam vent tube 26 defines an enclosed volume by its enclosing surface and has openings 21 and 23 at its lower and upper ends, respectively. Thus, in the illustrated form, the steam vent tube 26 is rectilinear, preferably square in cross-section, as illustrated in FIG. 1. A swirl device 22 for imparting rotation to the upwardly flowing two-phase mixture of water/steam is located below the bottom opening 21 of the steam vent tube 26 and above the end of the part-length fuel rods 16. For example, in FIG. 2, swirl device 22 may comprise an auger 40 mounted on a vertical shaft 42. The helical blade 44 of auger 40 is thus essentially wound on edge about shaft 42, the edge of blade 44 being secured to the shaft. The blade 44 of the auger may, but preferably does not, extend over the entire length of the shaft 42.

Preferably, however, the swirl device 22 comprises a generally helically arranged vane (FIG. 3) whose horizontal projected area is substantially coextensive with the horizontal cross-sectional area of the vent volume. The bottom opening 21 of the steam vent tube 26 is preferably circular with a diameter that is less than the minimum horizontal dimension of the vent volume to intercept the circular core flow of steam created by the swirl vane 22. Thus, the opening 21 is defined by a transition element 30 transitioning the circular opening 21 to a rectilinear cross-section. The transition element 30 additionally causes deflection of the separated liquid laterally outwardly onto the adjacent surfaces and into the interstices of the full-length fuel rods 12. The swirl vane 22 can be supported directly from the vent tube 26 or from a spacer.

In this simplest form of swirler, it will be appreciated that its minimum axial length for effective separation is that which results in a horizontal projected area covering a full 360°. Consequently, swirler 22 may comprise a single strip of material twisted 180° between its opposite ends to form a helical vane and hence provide a helical flow pattern in the vent volume. Note that the periphery of the swirler defines a circular projected plan and hence a majority of the area of the vent volume occupied by the swirler is subjected to the helical flow path.

More complex configurations of separation devices, for example, two or more twisted strips to form more complex swirlers may be provided. For example, two strips of material may be slotted at their opposite ends and interleaved along their axes. The strips are then maintained perpendicular along their length and twisted 90° to complete the full 360° horizontal projected area necessary to provide effective separation. Three strips of sheet material may be slotted adjacent their ends and likewise joined along their axes to initially provide strips 60° apart. By rotating or twisting the strips 60°, a full 360° projected area is provided.

To improve the efficiency of the swirl device, it will be recognized that in the generally rectilinear array of fuel rods, the vent volume has a generally rectilinear configuration, i.e., square or rectangular. With the typical projected circular plan area of the swirler, the regions between the corners of the square vent volume area and the circular projected plan area of the swirler constitute flow bypass regions. Thus, flow upwardly into the vent volume may bypass the swirler. To provide for more efficient swirl flow patterns without flow bypass or with only minimum flow bypass, the perimeter of the separation device can be shaped to generally conform to the perimeter of the vent volume defined by the adjacent fuel rods. Thus, the generally rectilinear vent volume can be substantially covered in plan area by the separation device. To accomplish this, a swirler of the type illustrated in FIG. 3, having a diameter corresponding to the longest diagonal of the area of the vent volume is formed. The outer circular edges of the strips forming the swirler may be removed to form a linear swirler having a generally rectilinear projected plan view. Thus, the perimeter of the separation device is shaped so that the resultant projected area in plan closely conforms with the vent volume flow passage whereby bypass flow around the edges of the separation device is substantially eliminated. It is recognized that the circular cross-section of the adjacent fuel rods causes the edges of vent volumes to have non-linear shapes. For maximum swirler effectiveness, the projected area of the swirlers can match those shapes. Thus, the edges of the separation device can be rounded. Further, adverse pressure drop created by a swirl device can be ameliorated by using a non-uniform separation device. Thus, the swirler 22 may progressively decrease in horizontal dimension, i.e., diameter as the swirler extends upwardly in the fuel bundle. For a more detailed description of the various forms of swirlers, reference is made to co-pending application Ser. No. 08/976,361, filed Nov. 21, 1997, the disclosure of which is incorporated herein by reference.

In operation, the swirl vane 22 imparts a rotation to the two-phase mixture such that separation occurs due to the centrifugal action. The higher density liquid flows laterally outwardly and the steam flows into the vent volume through the inlet opening 21 of the transition element 30 for expansion into the steam vent tube 26. The steam flow within the tube 26 is thus isolated from the outside two-phase mixture until it exits from the opening 23 at the top of the steam vent tube 26. The steam vent tube is of such length and the steam flowing therein is of such velocity that any liquid in the upper two-phase region surrounding the upper end of the steam vent tube is prevented from overflowing into the steam vent tube.

Figure 3:
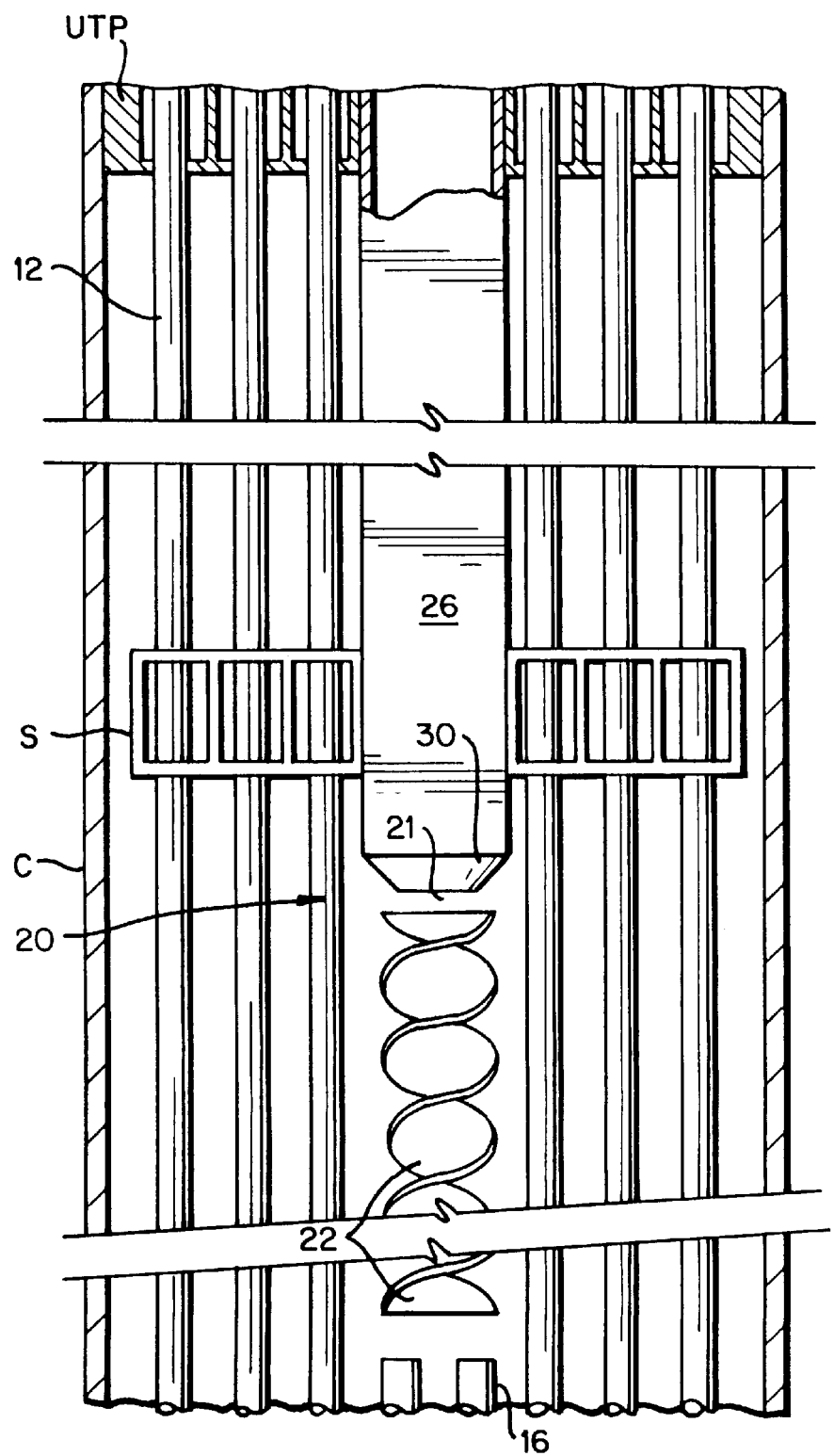
FIG. 3 is a view similar to FIG. 2 illustrating a further form of a separation device hereof.
Figure 4:
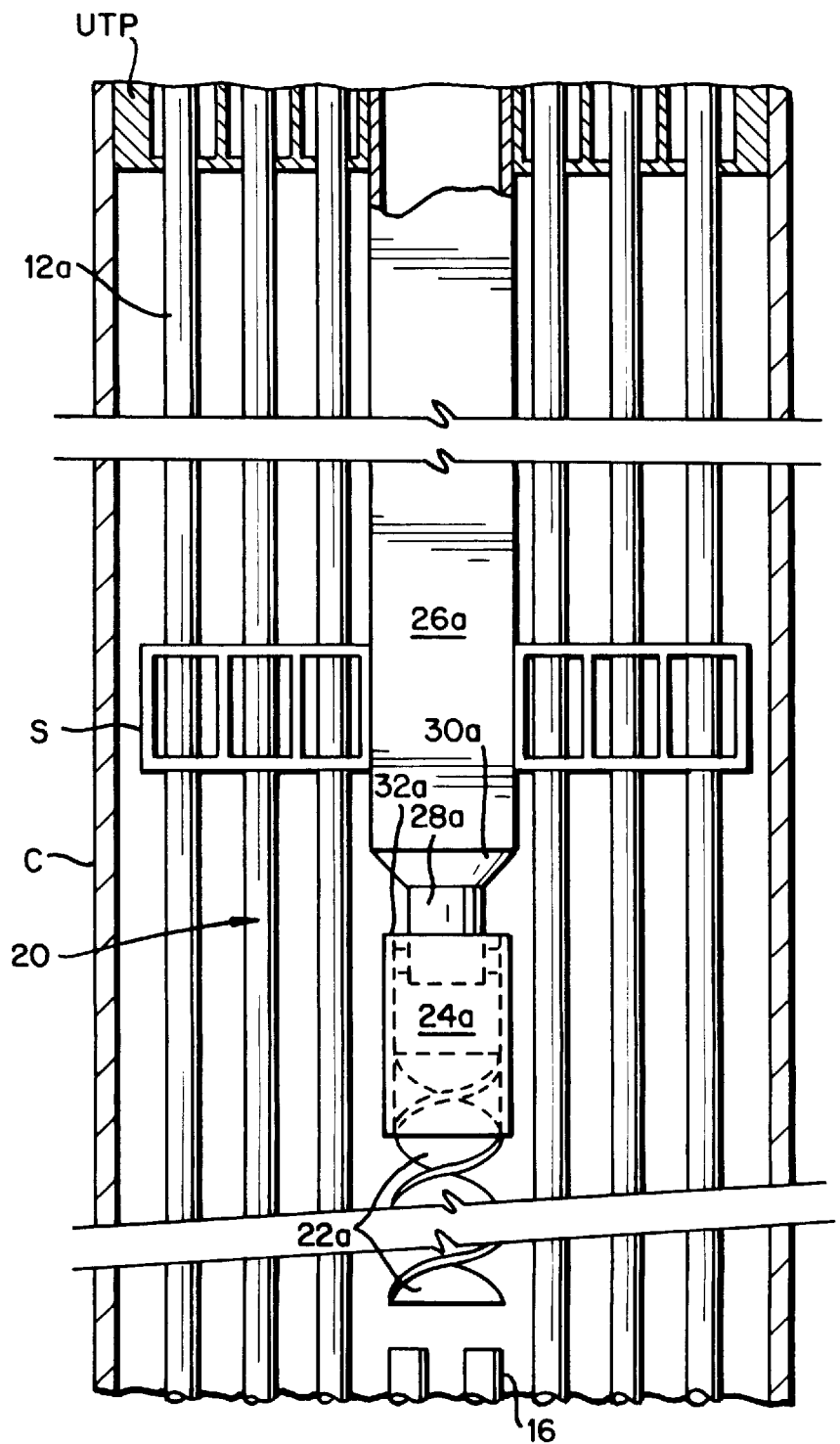
FIG. 4 is a view similar to FIG. 2 illustrating a further form of separation device hereof.

Referring now particularly to the embodiment of FIG. 4 wherein like reference numerals are applied to like parts as in the embodiments of FIGS. 2–3, followed by the letter "a," the separation device 20a may comprise a generally helically configured vane 22a depending from a separation barrel 24a. The separation barrel 24a is open at its lower end and receives the upper end of the helical vane 22a, the vane terminating within and approximately at one-half the length of barrel 24a. The vane is suitably secured to the barrel 24a.

The separation device also includes a steam vent tube 26a having a depending flow guide or pick-off tube 28a secured to a transition element 30a located between the steam vent tube 26a and pick-off tube 28a. Pick-off tube 28a extends within the barrel 24a and defines with the barrel 24a an outlet 32a. The barrel 24a and pick-off tube 28a, as illustrated, are cylindrical in configuration and therefore the outlet 32a comprises an annular outlet. It will be appreciated, however, that the barrel and the pick-off tube, as well as the outlet 32a, may have other cross-sectional configurations. Suitable supporting structures, for example, ribs interconnect the pick-off tube 28a and the barrel 24a whereby the assembly may be supported from the steam vent tube 26a. The steam vent tube 26a is in turn preferably secured to the upper tie plate but may be secured to a spacer S within the fuel bundle as illustrated in FIG. 3.

Also as illustrated in FIG. 3, the steam vent tube 26a is generally rectilinear, e.g., square, in configuration and occupies the entirety of the steam vent volume above the part-length fuel rods 16a. Further, the transition element 30a effects a transition structure between the rectilinear steam vent tube 26a and the depending cylindrical pick-off tube 28a. Importantly, however, the transition element 30a overlies the outlet 32a for purposes of deflecting the liquid issuing from outlet 32a into the adjoining lateral interstices of and onto the full-length fuel rods 12a.

In using the separation device 20a hereof, it will be appreciated that the lower half of the swirl device 22a is open so that preliminary separation can occur due to the centrifugal action imparted to the two-phase liquid by the swirl device 22a. Consequently, the higher density liquid is directed laterally outwardly onto the surfaces and into the interstitial volume of the full-length fuel rods, increasing the density of the liquid moderator in those regions. Further, the vapor of the two-phase mixture flows into the separation device, tending to follow closely the path about the helical vane. As illustrated, the upper half of the swirl device is enclosed by the barrel 24a. The barrel 24a isolates the liquid that has flowed laterally outwardly in the open swirl region from the region within the barrel. The barrel also causes the residual swirling liquid entering the lower end of the barrel to collect and flow as a circulating film on the inner wall surface of the barrel 24a. As a consequence, the circulating liquid film on the interior wall of the separation barrel flows between the barrel and the outer surface of pick-off tube 28a and through the annular passage and outlet 32a. This separates the residual liquid within barrel 24a from the steam which flows into the open lower end of pick-off tube 28a. As illustrated, the transition element 30a between the pick-off tube 28a and steam vent tube 26a serves as a deflector to deflect the liquid egressing from outlet 32a in a laterally outward direction into the region among the adjacent full-length fuel rods 12a. The steam flowing through the pick-off tube 28a expands and flows upwardly into the steam vent tube 26a.

Figure 5:
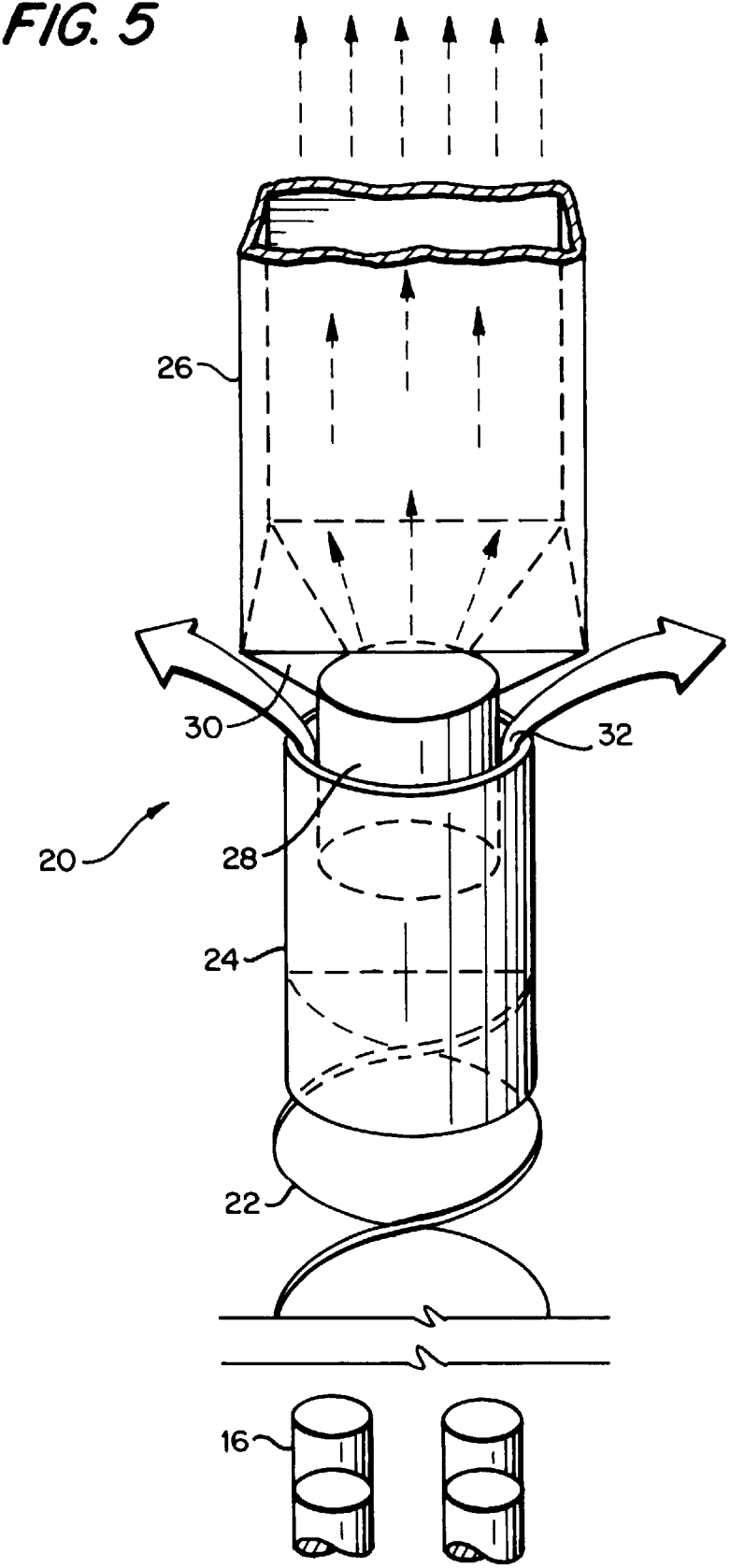
FIG. 5 is a fragmentary perspective view with parts broken out and in cross-section illustrating the separation device of FIG. 4 above the upper ends of part-length rods.

In a preferred embodiment of the present invention, the steam vent tube typically has a square cross-section, as illustrated in FIG. 5. It will be appreciated, however, that other cross-sections may be provided as desired, depending upon a particular arrangement of part-length and full-length rods within a fuel bundle. Additionally, the swirl device is illustrated as an auger or a single or multiple helical vane and it will be appreciated that other types of devices for imparting a swirl to the two-phase mixture may be used. Further, the separation device hereof may be sized and configured for use with groups of part-length rods terminating at different elevations within the fuel bundle. For example, a first group of four part-length rods may terminate at the fourth spacer and a separation device according to the present invention may be disposed in the steam vent volume above the fourth spacer with the steam vent tube terminating in the fifth spacer. An additional group of part-length rods adjacent the first group thereof may terminate at the fifth spacer. An enlarged separation device may be disposed in the vent volume above the fifth spacer occupying the volumes above both the first and second groups of part-length rods. Thus, the uppermost separation device would be significantly larger than the first separation device. Alternatively, side-by-side arrangements of the separation devices may be used for groups of part-length rods which terminate at their upper ends at different elevations in the fuel bundle.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In combination with a fuel bundle for a boiling water nuclear reactor, said fuel bundle including a lower tie plate for supporting a matrix of vertically upstanding fuel rods and defining apertures for the inflow of water to said fuel bundle, an upper tie plate for maintaining said matrix of rods in vertical upstanding relation and defining apertures for permitting the outflow of water and generated steam, a channel surrounding said fuel bundle and extending from said lower tie plate to said upper tie plate for confining fluid flow between said tie plates and through said matrix of rods, at least one of said rods being a part-length rod terminating at an upper end below said upper tie plate, said part-length rod defining with respect to surrounding full-length rods and said upper tie plate a vent volume overlying said part-length rod, and a separation device supported by said fuel bundle and disposed in said vent volume overlying said part-length rod and below said tie plate, said separation device including a separation barrel having a generally open lower end, a swirler for imparting rotation to liquid flowing generally upwardly into the separation barrel through the lower end thereof, said swirler having at least a portion thereof disposed in part within said barrel and a second portion thereof depending below said barrel, enabling laterally outward flow of liquid in a direction toward surrounding full-length fuel rods and flow of steam upwardly into the barrel, a steam vent tube disposed above said barrel, and a flow guide extending into said barrel for receiving the upward flow of steam therefrom for flow into said steam vent tube and defining with said barrel an outlet for liquid passing through the barrel.

2. The combination according to claim 1 wherein said steam vent tube includes a deflector disposed above said barrel for deflecting liquid passing through said outlet in a laterally outward direction.

3. The combination according to claim 1 wherein said steam vent tube has an upper portion having a cross-section larger than the cross-section of said barrel, said steam vent tube including a transitional element between said steam vent tube upper portion and said flow guide for deflecting liquid passing through said outlet in a laterally outward direction.

4. The combination according to claim 1 wherein said flow guide forms a part of said steam vent tube, said barrel and said steam vent tube flow guide being cylindrical and defining an annular outlet for the liquid passing upwardly through the barrel.

5. The combination according to claim 4 wherein said steam vent tube has an upper portion rectilinear in cross-section and carries a transitional element between said steam vent tube upper portion and said flow guide for deflecting liquid passing through said outlet in a laterally outward direction.

6. The combination according to claim 1 wherein said swirler comprises a generally helical swirl vane extending from and below said barrel.

7. The combination according to claim 6 wherein said barrel is cylindrical, said swirl vane having a diameter substantially corresponding to the interior diameter of said cylindrical barrel, said swirl vane extending into said barrel through the open lower end thereof.

8. A nuclear fuel bundle for a boiling water nuclear reactor comprising:

a plurality of generally parallel, laterally spaced, nuclear fuel rods extending vertically upwardly between a lower tie plate and an upper tie plate, with spaces between said rods for flowing coolant/moderator, at least one of said fuel rods terminating at an upper end thereof short of upper ends of adjacent surrounding fuel rods defining with said surrounding fuel rods a vent volume above said one fuel rod and in a two-phase fluid region of the bundle;

a separation device disposed in said vent volume for separating liquid and steam constituents of the coolant/moderator and including a separation barrel having a generally open lower end, a swirler for imparting rotation to the two-phase liquid flowing generally upwardly into the separation barrel through the lower end thereof, said swirler having a first portion thereof disposed in part within said barrel and a second portion thereof depending below said barrel enabling lateral outward flow of liquid and flow of steam upwardly into the barrel, and a steam vent tube disposed above said barrel and having a flow guide extending into said barrel for receiving the upward flow of steam therefrom, said steam vent tube defining with said barrel an outlet for liquid passing through the barrel.

9. A nuclear fuel bundle according to claim 8 including a deflector disposed above said barrel for deflecting liquid passing through said outlet in a laterally outward direction.

10. A nuclear fuel bundle according to claim 8 wherein said steam vent tube has an upper portion having a cross-section larger than the cross-section of said barrel, said steam vent tube including a transition element between said steam vent tube upper portion and said flow guide for deflecting liquid passing through said outlet in a laterally outward direction.

11. A nuclear fuel bundle according to claim 8 wherein said barrel and said steam vent tube flow guide are cylindrical, defining an annular outlet for the liquid passing upwardly through the barrel.

12. A nuclear fuel bundle according to claim 11 wherein said steam vent tube has an upper portion rectilinear in cross-section and carries a transitional element between said steam vent tube flow guide and said upper portion for deflecting liquid passing through said outlet in a laterally outward direction.

13. A nuclear fuel bundle according to claim 8 wherein said swirler comprises a generally helical swirl vane.

14. A nuclear fuel bundle according to claim 13 wherein said swirl vane is connected to said barrel and extends below said barrel.

15. A nuclear fuel bundle according to claim 14 wherein said barrel is cylindrical, said swirl vane having a diameter substantially corresponding to the interior diameter of said cylindrical barrel, said swirl vane extending into said barrel through the open lower end thereof.

16. A nuclear fuel bundle according to claim 8 wherein said barrel and said steam vent tube flow guide are cylindrical, defining an annular outlet for the liquid passing upwardly through the barrel, said steam vent tube having an upper portion carrying a transitional element between said steam vent tube flow guide and said upper portion for deflecting liquid passing through said outlet in a laterally outward direction, said swirler comprising a generally helical swirl vane having a diameter substantially corresponding to the interior diameter of said cylindrical barrel, said swirl vane extending into said barrel through the open lower end of said barrel.

17. A nuclear fuel bundle according to claim 16 wherein said steam vent tube upper portion is rectilinear in cross-section and said transitional element transitions between said cylindrical flow guide of said steam vent tube and said rectilinear upper portion thereof.

* * * * *